July 16, 1963     D. R. HOLBERT     3,097,525
PROFILING METHOD USING A NON-IONIZING ORGANIC ADDITIVE
Filed March 5, 1959     2 Sheets-Sheet 1

INVENTOR.
DON R. HOLBERT
BY
Adams Forward & McLean
ATTORNEYS

July 16, 1963  D. R. HOLBERT  3,097,525
PROFILING METHOD USING A NON-IONIZING ORGANIC ADDITIVE
Filed March 5, 1959  2 Sheets-Sheet 2

INVENTOR.
DON R. HOLBERT
ATTORNEYS.

[US Patent 3,097,525 — Patented July 16, 1963]

3,097,525
PROFILING METHOD USING A NON-IONIZING ORGANIC ADDITIVE
Don R. Holbert, Tulsa, Okla., assignor, by mesne assignments, to Sinclair Research, Inc., New York, N.Y., a corporation of Delaware
Filed Mar. 5, 1959, Ser. No. 797,454
5 Claims. (Cl. 73—152)

The present invention relates to a method using an interface between two dissimilar liquids, water and brine, to measure the permeability of a subterranean formation penetrated by a well bore. More particularly, the present invention is concerned with a moving interface procedure employing a water-soluble, non-ionizing organic compound in the water when profiling a well under surface vacuum.

Knowledge of the permeability of subterranean formations is highly desirable for oil production purposes, e.g. in secondary recovery operations.

Generally, in the moving interface procedure as applied to the measurement of the permeability of subterranean formations penetrated by a well bore, a stream of brine is pumped through a string of tubing extending downwardly below the formation and a stream of fresh water is pumped downwardly through the annular space formed between the tubing and the walls of the well bore. The amounts of fresh water and brine are controlled to form an interface below the formation. The fresh water is shut in for the brine pass in which the brine is injected at a constant flow rate as close to the normal well injection rate as is practical. Injection of the brine is continued until the interface has been moved from the bottom of the formation to the top. The velocity of interface travel over convenient depth increments is measured. When the interface has reached the upper limit of its travel, brine flow is stopped and fresh water flow started. The fresh water flow rate is maintained constant at the same flow rate as used for brine injection. Measurement of the velocity of interface travel down over the same depth increments as previously used for the ascending run constitutes a fresh water pass. From the data obtained the injection profile and the mean average well bore diameter can be computed.

Although the moving interface procedure is highly desirable for measuring the permeability of subterranean formations traversed by a well bore because it is fast, yields well bore diameter data, and is self-checking, the data provided when using this procedure to profile a well under surface vacuum is frequently incorrect during the brine injection pass. The incorrectness of this data is primarily the result of a manometering effect produced between the brine column in the tubing string and the liquid column in the annular space whose upper portion is fresh water. For example, as brine is introduced at a constant rate during a brine injection pass to cause the interface to move upwardly, its greater viscosity in comparison to that of fresh water necessitates an increase in pressure during injection to insure a constant injection rate. Since in the situation with which this invention is concerned the well is taking brine under vacuum, i.e. the bottom hole pressure in the well is less than the hydrostatic head in the well, the hydrostatic head of brine is raised to increase pressure.

However, the higher brine level produces a manometering effect with the fresh water column, thus causing the interface to "bounce" as it moves upwardly. Obviously, the data provided by a "bouncing" interface is of little value for permeability determinations, since an accurate measurement of the interface position as caused by brine injection cannot be made. The manometering effect in general causes the interface to move further up the annulus than should be experienced due to the continuing injection of the constant amount of brine.

An object of the present invention is the provision of a moving interface method for determining the "injectivity profile" or "permeability log" of a subterranean formation traversed by a well bore. Another object of the invention is the provision of a moving interface profiling method using water-soluble, non-ionizing organic additives in the fresh water for accurately measuring the permeability log of a well under surface vacuum during the brine injection pass.

In accordance with the method of the present invention for indicating the permeability of a subterranean formation traversed by a well bore and taking liquids under a vacuum, a stream of brine, in an amount sufficient to form a column of brine uncommunicative to the formation, e.g. at or below the bottom of the subterranean formation, is passed into the bore through a string of tubing extending downwardly below the formation. Fresh water, in an amount sufficient to cover the formation, is conducted downwardly through the annular space between the tubing and wall of the well or casing to form an interface, which is at or below the bottom of the formation, with the brine. The interface is caused to move upwardly by introducing more brine at a known and preferably constant rate. The elevation of the interface is determined from time to time as it ascends in the well and the interval of time elapsing between such determinations is recorded. The rate of ascent at any elevation of the interface is then determined from the distance traversed by the interface and the time elapsed. The rate of ascent of the interface is governed by the rate at which the fresh water containing organic additives escapes into the permeable portions of the formation above the interface under the pressure employed. Moreover, the rate of ascent of the interface decreases as the interface traverses a permeable formation or formations since the permeable formation receives the fresh water at a rate differing from the rate at which the relatively non-permeable bore hole walls receive fresh water, if any. The difference in these rates of ascent is used as a measure of the relative permeability of the portion of the formation traversed by the interface as its rate of ascent changes.

The fresh water employed in the method of the present invention includes water-soluble, non-ionizing organic additives in an amount sufficient to provide the fresh water with a viscosity at least as great as but essentially equivalent to the viscosity of the brine. The viscosity of the fresh water with additives will generally be about 15 centipoises or less, preferably less than about 3 or 5 centipoises, and will usually approximate the viscosity of the brine within about 0.05 centipoise. When the interface is tracked with electrical conductivity detection means, the organic additives should not materially affect the electrical conductivity characteristics of the fresh water. Among the organic additives suitable for addition to the fresh water employed in the present method are the hydroxyl-containing compounds, e.g. sugar, glycerol, glycols e.g. ethylene glycol; polyethylene oxides corresponding to the formula $RO(C_2H_4O)_nH$, e.g. "Polyox," a high molecular weight polyethylene oxide resin, product of the Union Carbide Chemicals Co., with an intrinsic viscosity of about 10; and polyamides of the formula

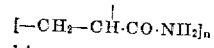

e.g. "PAM," a white powdery (solid) material. The polyethylene oxides, however, are preferable due to their lower cost.

The detection means employed for tracking the position of the interface in the well bore can vary. In one method the characteristics of the brine can be such that it is detectable by an electrical conductivity measuring unit. Thus, if the brine is essentially a good conductor and the fresh water is essentially a poor conductor, the conductivity measuring unit will indicate the degrees of current flow within the brine and fresh water. Accordingly, when conductivity circuits are essentially good, the instrument is in the brine and when the conductivity circuit is essentially poor, the instrument is in the fresh water. Thus, by raising and lowering the instrument, the interface between the two liquids can be located and by checking the depth of the detection instrument, the location of the interface is known.

A device suitable for use in measuring the electrical conductivity of the fluids in the well bore is described in U.S. Patent No. 2,776,563. This device, known as a magnetic coupler, includes a magnetic core, and two electrically conducting coils essentially composed in two basic combinations. One of the combinations, conveniently referred to as a magnetic coupler sub, is essentially comprised of one of the coils, the first coil, surrounding the magnetic core, and fixedly mounted within a structure. The other combination, conveniently referred to as the stinger, comprises a cable containing an insulated electrical conductor communicating with the other coil which is contained within a structure adapted to removably surround the first coil. Additionally, if a two-conductor cable is employed in the stinger arrangement, the stinger itself can be used as an integral detection unit.

Another device suitable for use in measuring the electrical conductivity of fluids in the well bore is described in the patent application of S. E. Szasz, Serial No. 618,583, filed on October 26, 1956, now Patent No. 2,894,200. This device includes a fluid receiving tube or "socket" which is housed in a brine injection tubing which may be composed of an upper electrically conducting portion and a lower electrically non-conducting portion. The "socket" is a tube of insulating material, closed at the lower end and having an electrically-conducting contact disposed on or near its bottom, said contact being connected by an insulated wire to an electrode on the outside of the non-conducting portion of the brine injection tubing. The contact is covered with a pool of electrically conducting fluid such as mercury and on top of the pool of conducting fluid is a layer of electrically non-conducting fluid such as carbon tetrachloride, or any non-conducting fluid heavier than brine. The supporting structure for the socket unit advantageously comprises a star or cross-bar construction so that a continuous cross-sectional area is not encountered by fluids within the tubing.

A second part of the device which is lowered into the socket, comprises an electrical conductor which may have a stainless metal, e.g. steel, contact piece soldered, brazed or otherwise connected to its lower end. Above the contact piece, the wire can be insulated with any suitable material for instance a plastic such as "Teflon," which is resistant to the non-conducting fluid. A protecting sheath of metallic, e.g. stranded steel wire, or other material may surround the plastic sheath.

The invention can be more clearly described with reference to the following illustrative example and the drawing.

Figure 2:
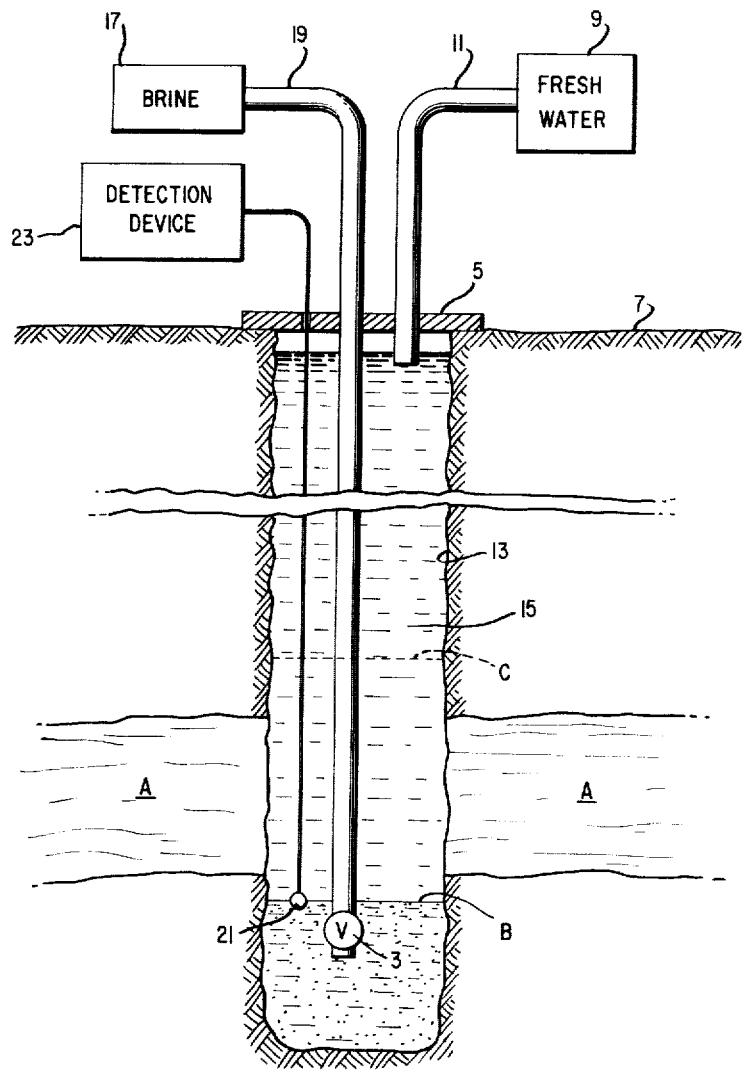
FIG. 2 is a vertical, sectional view of a well showing the apparatus for making a permeability log.

The permeability log is desired for a permeable subterranean formation A traversed by a well bore as shown in FIGURE 2. A string of ½" tubing 19 having a one-way check valve 3 on its lower end is passed through a casinghead 5, located at the earth's surface 7, and downwardly through the well to a point below the formation. Fresh water 9 (with an electrical conductivity of about 120 ma.), a specific gravity of about 1.002, a viscosity of about 1.3 centipoises at 80° C., containing 0.5 pound of sugar per gallon of fresh water, is passed downwardly by way of conduit 11 into the well bore 13 through the space 15 between the tubing and well bore wall and extends considerably above the top of the permeable formation A. 5 gallons per minute (g.p.m.) of saturated brine 17 with a specific gravity of 1.12, a viscosity of 1.3 centipoises at 80° F. and with an electrical conductivity of about 460 milliamps (ma.), are pumped by way of conduit 19 into the tubing, move downwardly therein, and exit through the one-way check valve at the lower extremity of the tubing. The fresh water forms an interface B, with the brine column, located below the formation and also forms a fresh water column which covers the formation. The fresh water column is located in the annular space between the tubing and the well wall. A detecting device 23 consisting essentially of a stinger 21 employing a two-conductor cable is inserted in the annular space to locate and track the interface. After establishing this interface in this well containing tubing under vacuum, the brine column and the fresh-water column are equivalent in bottomhole pressure and both are above the permeable formation and below the surface of the earth at a height whose hydrostatic pressure give a well intake of about 5 gal./min.

The pumping of brine at a substantially constant rate of 5 gallons per minute into the ½" tubing causes the interface to move upwardly past the permeable formation to a position indicated at C. The interface is tracked with the detecting device. The procedure of the present invention is usually combined with a fresh water pass, in which the fresh water instead of the brine is injected into the well bore at a steady rate to cause the interface to move downwardly past the permeable strata. For instance, the fresh water pass could be conducted first by filling the ½" tubing in the well bore with an amount of brine sufficient to pass through the lower extremity of the tubing and form a column of brine such as is indicated at C covering the formation exposed to the annulus. The lower extremity of the tubing is provided with a check valve 3 to allow liquid flow from the inside of the tubing into the well area but not from the well area into the tubing. Fresh water, containing sugar is introduced into the annulus 15, forms a column in the annulus and meets with the heavy liquid at an interface indicated as C located above the formation A. The interface is caused to move downwardly in the well bore past the permeable stratum by injecting fresh water down the annulus at a substantially constant rate. The rate of descent of the interface is used as an indication of the permeability of the formation. When the interface is below the lower level of the formation shown as B, fresh water injection is discontinued, brine injection into the tubing at a substantially constant rate is commenced, and the interface is caused to move upwardly in accordance with the procedure of the present invention and thus provide corroborative data relative to the permeability of the subterranean formations. Thus the permeability of the formation is determined by its ease of accepting liquid as indicated by the rate at which the interface ascends up the annular space in the well bore past the formation.

Figure 1:
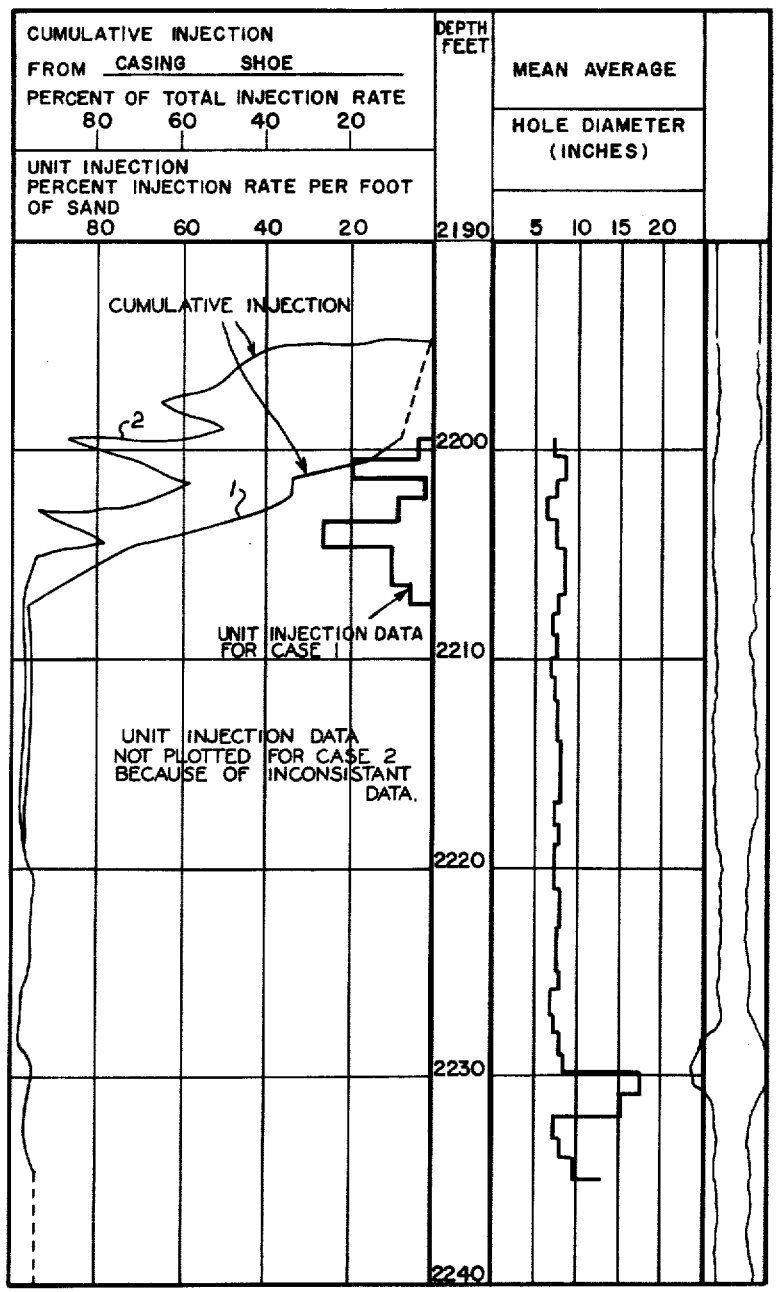
FIGURE 1 shows an injection profile for the well and the well bore diameter at certain depths where it was shot.

The injection profile as well as the well-bore diameter of a well located in Pawnee County, Oklahoma, was obtained using the procedure set forth above. The results are presented in FIGURE 1 showing the injection profile for the well and the well bore diameter at certain depths where it was shot. The fresh water contained 0.5 pound of sugar per gallon of water, the brine injection rate was substantially maintained at 5 gallons per minute with an injection pressure at surface vacuum. Line 1 represents the plot of data obtained when following the procedure of the present invention whereas line 2 represents a plot illustrative of a conventional procedure exhibiting the "bouncing" interface created by the manometering effect when sugar is not incorporated in the fresh water. The conventional procedure is generally conducted essentially in the same manner as described above illustrating the present invention except that sugar was not incorporated in the fresh water.

The injection profile of FIGURE 1 which plots percent cumulative injection rate versus well depth in feet, was determined by the process of the present invention and shows that the well bore diameter between 2235.4' and 2206.8' varied from about 6.5" to 17.5". The permeable area was located between about 2207.4' and 2199'.

In view of the above description, it will be obvious to those skilled in the art that by obtaining similar information on a plurality of levels of a permeable stratum traversed by a well bore, a comparison of this data will provide an accurate account of the relative permeabilities of the various strata and thus the injection profile or permeability log of the well bore can be determined.

It is claimed:

1. In a method for determining the fluid permeability of a subterranean formation traversed by a well bore taking liquids under "surface vacuum" containing a tubing extending downwardly below the formation and forming an annulus between the tubing and the face of the formation, the steps comprising providing brine in the tubing in an amount sufficient to form a column uncommunicative with the formation in the tubing annulus; providing in the annulus fresh water containing a non-ionizing organic additive in an amount sufficient to impart a viscosity to the water essentially the same as the viscosity of the brine, said fresh water covering the formation; said brine and fresh water forming two liquid columns meeting in the annulus at an interface located below the formation; introducing additional amounts of brine into the tubing at known rate to cause the interface to ascend in the annulus with the upper levels of the columns being maintained below the surface of the earth; determining the rate of ascent of the interface in the well bore, its rate of ascent changing on traversing a permeable portion of the well; and ascertaining the elevation of the interface as its rate of ascent changes, the change in rate of ascent being a measure of the permeability of the formation at the elevation at which the rate of ascent changes.

2. In a method for determining the fluid permeability of a subterranean formation traversed by a well bore "under vacuum" containing a tubing extending downwardly below the formation and forming an annulus between the tubing and the face of the formation, introducing brine into the tubing in an amount sufficient to form in the tubing annulus a column uncommunicative with the formation, introducing into the annulus fresh water in an amount sufficient to cover the formation, said brine and fresh water forming two liquid columns meeting in the annulus at an interface located below the formation, introducing additional amounts of brine into the tubing at known rate to cause the interface to ascend in the annulus with the upper levels of the columns being maintained below the surface of the earth, determining the rate of ascent of the interface in the well bore, its rate of ascent changing on traversing a permeable portion of the well, and ascertaining the elevation of the interface as its rate of ascent changes, the change in rate of ascent being a measure of permeability of the formation at the elevation at which the rate of ascent changes; the step comprising incorporating into the fresh water a non-ionizing organic additive in an amount sufficient to impart a viscosity to the water essentially the same as the viscosity of the brine.

3. In the method of claim 2 wherein the non-ionizing organic additive is sugar.

4. In a method for determining the fluid permeability of a subterranean formation traversed by a well bore taking liquids under "surface vacuum" containing a tubing extending downwardly below the formation and forming an annulus between the tubing and the face of the formation, the steps comprising introducing brine in the tubing in an amount sufficient to form in the tubing annulus a column uncommunicative with the formation, introducing into the annulus fresh water containing a non-ionizing organic additive in an amount sufficient to impart a viscosity to the water essentially the same as the viscosity of the brine, said fresh water covering the formation; said brine and fresh water forming two liquid columns meeting in the annulus at an interface located below the formation, lowering an interface detector into the well to the interface; introducing additional amounts of brine into the tubing at known rate to cause the interface to ascend in the annulus with the upper levels of the columns being maintained below the surface of the earth; determining the rate of ascent of the interface in the well bore, its rate of ascent changing on traversing a permeable portion of the well; and ascertaining the elevation of the interface as its rate of ascent changes, the change in rate of ascent being a measure of the permeability of the formation at the elevation at which the rate of ascent changes, said detector continuously following the ascent of the interface whereby the elevation and rate of ascent of the interface may be determined.

5. The method of claim 4 wherein the non-ionizing organic additive is sugar.

References Cited in the file of this patent

UNITED STATES PATENTS

| | | |
|---|---|---|
| 2,376,878 | Lehnhard | May 29, 1945 |
| 2,700,734 | Egan et al. | Jan. 25, 1955 |
| 2,775,121 | Bennett et al. | Dec. 25, 1956 |

UNITED STATES PATENT OFFICE
CERTIFICATE OF CORRECTION

Patent No. 3,097,525

July 16, 1963

Don R. Holbert

It is hereby certified that error appears in the above numbered patent requiring correction and that the said Letters Patent should read as corrected below.

Column 4, line 3, for "1.002" read -- 1.022 --.

Signed and sealed this 9th day of June 1964.

(SEAL)
Attest:

ERNEST W. SWIDER
Attesting Officer

EDWARD J. BRENNER
Commissioner of Patents